United States Patent [19]

Fields et al.

[11] 4,118,554

[45] Oct. 3, 1978

[54] AGGREGATED POLYELECTROLYTES

[75] Inventors: Joseph E. Fields, Balwin; Robert J. Slocombe, St. Louis, both of Mo.

[73] Assignee: Monsanto Company, St. Louis, Mo.

[21] Appl. No.: 818,919

[22] Filed: Jul. 25, 1977

[51] Int. Cl.$^2$ .............................. C08F 6/00; C08F 8/32
[52] U.S. Cl. .............................. 526/15; 210/DIG. 23;
260/112 R; 260/122; 260/112 B; 424/177; 526/49; 526/50; 528/491; 528/492; 528/494; 528/497
[58] Field of Search ............... 526/15; 528/491, 497, 528/492, 494

[56] References Cited

U.S. PATENT DOCUMENTS

| 3,157,595 | 11/1964 | Johnson et al. | 210/54 |
|---|---|---|---|
| 3,340,680 | 9/1967 | Fields et al. | 55/22 |
| 3,398,092 | 8/1968 | Fields et al. | 210/24 |
| 3,554,985 | 1/1971 | Fields et al. | 260/785 |
| 3,555,001 | 1/1971 | Walis et al. | 260/112 |
| 3,651,213 | 3/1972 | Wallis et al. | 424/89 |
| 3,655,509 | 4/1972 | Fields et al. | 195/1.5 |

*Primary Examiner*—Stanford M. Levin
*Attorney, Agent, or Firm*—Scott J. Meyer; James W. Williams, Jr.

[57] ABSTRACT

The filterability, drying characteristics and physical form of water-insoluble, cross-linked polyelectrolytes containing amine-imide functional groups is improved without substantially diminishing the protein adsorption capacity of said polyelectrolytes by heating the polymeric starting material in inert organic solvent at a temperature ranging from about 115° C to about 160° C but lower than the softening point of said polymer for at least about 15 minutes and until said polymer is substantially aggregated prior to crosslinking.

10 Claims, 2 Drawing Figures

AGGREGATED POLYELECTROLYTES

BACKGROUND OF THE INVENTION

This invention relates to the production of improved polyelectrolytes which are useful in the fractionation of blood and other proteinaceous substances. More particularly, this invention relates to aggregated water-insoluble, cross-linked polylectrolyte polymers having amine-imide functional groups.

Recently, there has been disclosed the production of certain polyelectrolyte polymers which are useful for a variety of protein separation systems. Thus, U.S. Pat. No. 3,554,985 describes the preparation of water-insoluble, cross-linked polyelectrolyte polymers having diloweralkylaminoloweralkylimide functional groups. These polyelectrolytes have been found to be useful in the fractionation of blood plasma and serum as described in U.S. Pat. No. 3,555,001 and for the separation of viruses from non-viral proteins as disclosed in U.S. Pat. Nos. 3,655,509 and 3,846,543. These polyelectrolyte polymers also are useful for the immunization of animals against viral diseases as seen from U.S. Pat. No. 3,651,213 and for the purification of water by the removal of contaminating bacteria and viruses as set forth in U.S. Pat. No. 3,398,092.

In U.S. Pat. No. 3,554,985, the water-insoluble, cross-linked polyelectrolytes are further described as being copolymers of an (a) unsaturated monomer of 2 to 12 carbon atoms and (b) a monomer selected from the group consisting of (1) a mixture of an unsaturated polycarboxylic acid or anhydride and an unsaturated polycarboxylic acid amine-imide, and (2) an unsaturated polycarboxylic acid amine-imide. In a typical example, the starting copolymer comprises the reaction product of styrene and maleic anhydride cross-linked with divinyl benzene (Example 1, Column 16) which is subsequently converted to the amine-imide derivative by reaction with dimethylaminopropylamine (Example 2, column 16). In other typical examples, a preformed polymer such as a copolymer of ethylene and maleic anhydride is cross-linked during the reaction with the dialkylaminoalkylamine by also employing in the reaction a predetermined amount of a difunctional compound such as ethylenediamine (column 12, lines 27–40).

Notwithstanding the favorable properties of the foregoing polyelectrolytes for their intended uses, it has been found in practice that they are difficult to handle in processing due to certain of the physical and chemical properties of the initially preformed polymer. Thus, it has been found difficult to filter the preformed polymer from the mother liquor following the initial polymerization reaction. Thick slurries of the polymer are formed which are slow to filter and give very dense filter cakes that do not break up readily. On drying, these products give a hard, lumpy material that requires excessive grinding.

While various procedures have been considered for overcoming these problems in processing of the polymer, a principal ultimate use of the polymer for protein fractionation following substitution with the functional amine-imide group dictates that the protein adsorption capacity and protein selectivity of the polymer be not substantially impaired.

SUMMARY OF THE INVENTION

In accordance with the present invention, polyelectrolytes of the general type described hereinbefore are significantly and substantially improved by an aggregation process whereby the protein adsorption capacity not only is unimpaired but, surprisingly, also is improved in certain blood fractionation systems. Briefly stated, the aggregation process comprises treatment of the preformed copolymer, prior to cross-linking and the addition of the functional amine-imide group, with refluxing xylene or other such inert organic solvents. This treatment is carried out at a temperature ranging from about 115° C. to about 160° C. but lower than the softening point of the polymer for at least about 15 minutes and until the polymer is substantially aggregated. The product obtained by this treatment is an aggregated polymer which filters rapidly and in which the filter cake breaks apart so easily that ball milling is no longer necessary in most instances. Drying of the filtered material also is faster with the aggregated polymer than with the unaggregated polymer. The protein adsorption capacity of the subsequently prepared cross-linked material containing the amine-imide functional group is substantially undiminished. In an illustrative preferred example, the albumin adsorption capacity of the aggregated material has been found to be more than three times that of the unaggregated material. These results are surprising because one would expect that a more finely divided material having a greater surface area would also have a correspondingly greater adsorption capacity than an aggregated material.

The properties of the aggregated polyelectrolyte in which grinding is unnecessary for obtaining suitable handling characteristics differ markedly from those of a ground, unaggregated polyelectrolyte. These differing products have non-equivalent particle structures. It has been found that the protein adsorption characteristics of these products involve both their chemical and physical properties. The desired aggregated polyelectrolyte is prepared with due consideration of difference in the molecular structure of the external shell and the internal core of the particles. When the particles are reduced by grinding, the shell-core relationships are changed. For this reason, (1) size reduction of polyelectrolyte particles is preferably avoided and (2) the desired structures for polyelectrolyte particles are achieved by synthesis sequences which develop the surface characteristics and basic core structure preferred for selective adsorption and elution of specific proteins. Thus, aggregation relates to the overall particle structure and its requirements for protein fractionation as well as providing important process advantages.

DETAILED DESCRIPTION OF THE INVENTION

In the present invention, several embodiments of the aggregated polymer are contemplated by the inventors. While the specification concludes with claims particularly pointing out and distinctly claiming the subject matter regarded as forming the present invention, it is believed that the invention and its advantages will be better understood from the following description of the preferred embodiments taken in connection with the accompanying drawings in which:

In general, the initial polymers which are aggregated in accordance with this invention include those disclosed in the aforementioned U.S. Pat. Nos. 3,554,985 and 3,555,001, said patents being incorporated herein by reference. Preferably, the initial polymer comprises a copolymer of (a) unsaturated monomer having from 2 to about 18 carbon atoms and (b) a monomer selected from the group consisting of unsaturated polycarboxylic acids and anhydrides having from 4 to about 12 carbon atoms. Following the aggregation process, the aggregated polymer is cross-linked and substituted with an appropriate amine-imide group.

Suitable amine-imide groups include not only those specifically described in U.S. Pat. Nos. 3,554,985 and 3,555,001, but also cyclic amine-imide groups as defined hereinbelow.

It is critical to the present invention that the desired aggregation process be carried out prior to the cross-linking and substitution with the major proportion of amine-imide groups. It has been found that when the cross-linking and/or the substitution with excessive amounts of the functional amine-imide group is carried out prior to the attempted aggregation process, the desired aggregation is not achieved and the advantages of the invention are not obtained. These results are surprising inasmuch as they are contrary to the expectation that the presence of the functional group would tend to make the polymer softer and thereby more readily susceptible to aggregation by simple particle fusion. By the term "major proportion" is meant more than 50% of said groups.

Although the inventors are not bound by theory, the importance of carrying out the aggregation process prior to cross-linking and/or the addition of the major portion of the functional group may be due in part to a bridging reaction to form acyclic anhydride groups between carboxyl groups on the backbones of different polymer molecules on adjacent particle surfaces. This bridging differs from the usual anhydride formation by adjacent carboxyl groups on a backbone of a given polymer molecule. These differences can be illustrated structuraly as follows:

In the latter process

In the present process

The anhydride copolymers normally contain up to 2% moisture, and a portion of this reacts with anhydride groups to form carboxylic acid groups while the remainder is assumed to be present as free water. The latter is rather easily lost on drying, while the former is released by reforming either cyclic or acyclic anhydride groups. This is a slower process; however, it occurs readily under conditions that favor aggregation, e.g. refluxing xylene.

For purposes of convenience, the preferred initial polymers which are subjected to the aggregation process as defined herein will be referred to as EMA-type polymers (ethylene/maleic anhydride or acid). The EMA-type polymers have been described previously in U.S. Pat. Nos. 3,554,985 and 3,555,001 and are further illustrated by the general examples in the following section I:

I

The polycarboxylic acid polmers can be of the non-vicinal-type including those containing monomer units, such as acrylic acid, acrylic anhydride, methacrylic acid, crotonic acid or their respective derivatives, including partial salts, amides and esters or of the vicinal type, including maleic, itaconic, citraconic, α-dimethyl maleic, α-butyl maleic, α-phenyl maleic, fumaric, aconitic, α-chloromaleic, α-bromomaleic, and α-cyanomaleic acids including their salts, amides and esters. Anhydrides of the foregoing acids are also advantageously employed.

Co-monomers suitable for use with the above polycarboxylic acid monomers include α-olefins, such as ethylene, 2-methylpentene-1, propylene, isobutylene, 1- or 2-butene, 1-hexene, 1-octene, 1-decene, 1-dodecene, 1-octadecene, and other vinyl monomers, such as styrene, α-methyl styrene, vinyltoluene, vinyl acetate, vinyl chloride, vinyl formate, vinyl alkyl ethers, e.g. methylvinyl-ether, alkyl acrylates, alkyl methacrylates, acrylamides and alkylacrylamides, or mixtures of these monomers. Reactivity of some functional groups in the copolymers resulting from some of these monomers permits formation of other useful functional groups in the formed copolymer, including hydroxy, lactone, amine and lactam groups.

Any of the said carboxylic acids or derivatives may be copolymerized with any of the other monomers described above, and any other monomer which forms a copolymer with unsaturated carboxylic acids or derivatives. Although these copolymers can be prepared by direct polymerization of the various monomers, frequently they are more easily prepared by an after-reaction modification of an existing copolymer. Copolymers are conveniently identified in terms of their monomeric constituents. The names so applied refer to the molecular structure and are not limited to the polymers prepared by the copolymerization of the specified monomers.

Representative EMA-type carboxylic acid or anhydride-olefin polymers, especially maleic acid or anhydride-olefin polymers of the foregoing type are known, for example, from U.S. Pat. Nos. 2,378,629; 2,396,785; 3,157,595; and 3,340,680. Generally, the copolymers are prepared by reacting ethylene or other unsaturated monomer, or mixtures thereof, with the acid anhydride in the presence of a peroxide catalyst in an aliphatic or aromatic hydrocarbon solvent for the monomers but nonsolvent for the interpolymer formed. Suitable solvents include benzene, toluene, xylene, chlorinated benzene and the like. While benzoyl peroxide is usually the preferred catalyst, other peroxides such as acetyl peroxide, butyryl peroxide, ditertiary butyl peroxide, lauroyl peroxide and the like, or any of the numerous azo catalysts, are satisfactory since they are soluble in organic solvents. The copolymer preferably contains substantially equimolar quantities of the olefin residue and the anhydride residue. Generally, it will have a degree of polymerization of about 8 to 100,000, preferably about 100 to 5,000, and a molecular weight of about 1,000 to 1,000,000, preferably about 10,000 to 500,000. The properties of the polymer, such as molecular weight, for example, are regulated by suitable choice of the catalyst and control of one or more of the variables such as ratio of reactants, temperature, and catalyst concentration or the addition of regulating chain transfer agents, such as diisopropyl benzene, propionic acid, alkyl aldehydes, and the like. Numerous of these polymers are commercially available.

The aggregation of the foregoing EMA-type polymers and other such polymers as defined herein is carried out by stirring the polymer as a suspension in refluxing or heated organic solvent which is inert to the polymer. This refluxing or heating is carried out at a temperature ranging from about 115° C. to about 160° C. but lower than the softening point of the polymer. A preferred solvent is xylene. Other solvents which can be used are, for example, ethylbenzene, mono- and dichlorobenzene and cumene. Solvents such as benzene and toluene having boiling points below about 115° C. are not practical for purposes of this invention. However, dioxane which boils at 101.5 can yield appreciable polymer coagulation probably due to stronger solvent action on EMA. It has been found that treatment of the polymer in boiling solvent at temperatures below about 115° C. does not provide any significant aggregated product as desired herein when using weak solvents such as hydrocarbons. Aggregation can occur in high boiling solvents at temperatures below the boiling point, but temperatures above the melting point of the polymer are unsuitable in view of the detrimental effect they can have upon the polymer structure and on subsequent use in the polyelectrolyte adsorption of proteins.

Heating of the polymer in the refluxing solvent for at least about 15 minutes is desired, and good results have been obtained by heating up to about one hour. Heating for prolonged periods of time substantially in excess of about one hour is unnecessary, but the aggregates remain stable in weak solvents even during such prolonged heat treatment up to 7 hours. The stronger solvents such as chlorobenzene, dichlorobenzene, dioxane and N,N-dimethylamine are less preferred solvents because of excessive coagulation that occurs on extended aggregation times.

Following the aggregation process, the aggregated polymer is cross-linked and substituted with the desired amine-imide groups in whatever sequence optimizes the properties being sought by tailoring the distribution of specific groups within the particles. These groups are essentially basic groups which can be aliphatic straight chain groups or can be alicyclic or aromatic groups. The aliphatic straight chain groups preferably are diloweralkylaminoloweralkylimide groups or loweralkyliminodi(loweralkylimide) linkages as described previously in U.S. Pat. Nos. 3,554,985 and 3,555,001. Such products are further illustrated by the general examples in the following section II:

II

The initial copolymers of anhydrides and another monomer can be converted to carboxyl-containing copolymers by reaction with water, and to ammonium, alkali and alkaline earth metal and alkylamine salts thereof by reaction with alkali metal compounds, alkaline earth metal compounds, amines or ammonia. Other suitable derivatives of the above polymers include the alkyl or other esters, alkyl amides, dialkyl amides, phenylalkyl amides or phenyl amides prepared by reacting carboxyl groups on the polymer chain with the selected amines or alkyl or phenylalkyl alcohol, as well as amino esters, amino amides, hydroxy amides and hydroxy esters, wherein the functional groups are separated by alkylene, phenyl, phenylalkyl, phenylalkylphenyl, or alkylphenylalkyl or other aryl groups. Moieties bearing amine or amine salts including quaternary salt groups are conveniently formed by reaction of the carboxyls of their anhydride precursors where applicable with polyfunctional amines such as dimethylaminopropylamine at higher temperatures forming an imide linkage with vicinal carboxyls. Such pendant free amine groups can then be converted, if desired, to their simple or quaternary salts.

Partial imides of a starting carboxyl or carboxylic acid anhydride containing polymer, e.g. EMA, are produced by:

(A) Heating a limiting amount of a secondary or tertiary aminoloweralkylamine with the anhydride or carboxylcontaining form of the polymer in a suitable solvent (e.g. xylene) at a temperature of about 140°–150° C. until water is no longer given off. Such a reaction simultaneously results in formation of imide groups in proportion to the amount of amine added and in the reformation of anhydride groups for the remainder of the polymer units. In this manner, imide-polymer products are formed which typically possess 2–100% imide linkages, the remaining carboxyl groups, when present, being in the anhydride form.

(B) Alternatively, a partial amide polymer product can be converted to the partial imide polymer product by heating a partial amide-polymer product in vacuo at 140°–150° C. until water is no longer given off. Such an imide polymer product likewise possesses comparable proportions of imide and anhydride groups depending upon the number of amide groups originally contained in the starting partial amide-polymer product.

Partial secondary or tertiary aminoloweralkylamides of the starting carboxyl or carboxylic acid anhydride-containing polymer, e.g. E.M.A., are obtained by contacting the polymer with a limiting amount of the selected amine in suspension in a solvent such as benzene or hexane, resulting in formation of a partial amide-acid anhydride derivative of the polymer, or a corresponding amide-carboxylate derivative thereof. The number of amide groups is dependent upon the quantity of the amine used as compared with the quantity of polymer employed. Such amide-polymer products typically comprise 2–100% amide groups, with remaining carboxyl groups being present as acid or anhydride groups.

Suitable blocking and unblocking of the amine moiety of the reactant employed in preparing amines or imides may be effected when required. Residual, non-modified polymer units may optionally be converted to neutral groups or units by attachment to the polymer molecule of compounds including alkylamines, aminoalcohols and alcohols.

Alternatively, additional cationic character can be provided in the polymer through incorporation of monomers which impart a basic or cationic character such as C-vinyl pyridines, vinyl amine, the several amino-substituted vinyl benzenes (or toluenes and the like), amine-bearing acrylates (or methacrylates and the like), vinyl imidazole and similar such monomers.

Thus, in any event, the polymer product will have residual active or reactive groups which can be of various types, including mixtures, but these residual active or reactive groups or residual "reactive sites" in the polymer will in one way or another comprise a certain percentage which are of a basic nature, so as to impart the requisite basic nature to the polymer product.

Especially preferred polymers subject to the previously referred to requirements are selected from the group consisting of ethylene/maleic acid or anhydride copolymers, styrene/maleic acid or anhydride copolymers, and isobutylene/maleic acid or anhydride copolymers.

As will be apparent from the foregoing, the essential basic groups of the polycationic or polyampholytic polyelectrolyte (PE) employed are of an imide nature involving diloweralkylaminoloweralkylimide groupings, as produced by reacting a diloweralkylaminoloweralkylamine with the carboxyl groups of a pre-formed polymer or by polymerizing an unsaturated olefin with an unsaturated anhydride or acid having such pre-formed imide groups in at least a portion of the unsaturated polycarboxylic acid reactant. According to the invention, such groups are preferred for purposes of the invention.

Alternatively, whether such pre-formed groups are or are not present, imide groups can be provided by crosslinking the polymer with a loweralkyliminobis(-loweralkylamine) which in the process of crosslinking by reaction between the terminal amine groups of the crosslinker and carboxyl groups in the polymer chain is productive of imido groups at both ends of the crosslinking chain with formation of the desired loweralkyliminobis(lower-alkylamide) linkages. Other groups, such as diloweralkylaminoloweralkylimide groups, from which the desired imide groups can be obtained by heating at elevated temperatures, can also be present. Also, diloweralkylaminoloweralkyl ester groups can be present, as well as other groups, so long as the prescribed percentages of imide groups of the prescribed type are also present in the polyelectrolyte molecule as well as the residual acid groups of the starting unsaturated acid or anhydride when the polyelectrolyte is a polyampholyte. As will be recognized, both the acid groups and the imide groups need not necessarily be present in the polyelectrolyte as such, but can be present in the form of their simple derivatives, e.g. salts, as already indicated.

Figure 1:
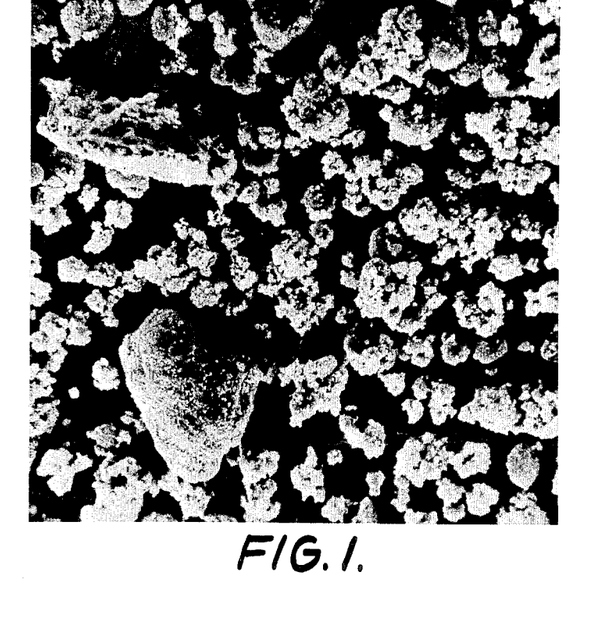
FIG. 1 is a photomicrograph (200 ×) of an aggregated water-insoluble cross-linked polymer of this invention.
Figure 2:
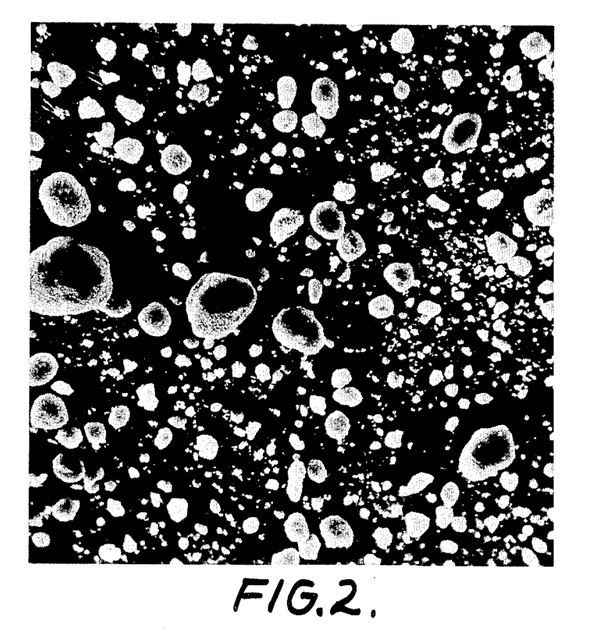
FIG. 2 is a photomicrograph (200 ×) of another batch of the polymer of FIG. 1 but in unaggregated form.

The alicyclic or aromatic groups which can be substituted on the aggregated EMA-type polymers are for example, aminoloweralkyl-pyridine, piperidine, piperazine, picoline, pyrrolidine, morpholine and imidazole. These groups can be substituted on the aggregated polymer in a manner analogous to the aliphatic chain amines but by using, instead, cyclic amines such as, for example:

2-aminopyridine
2-amino-4-methylpyridine
2-amino-6-methylpyridine
2-(2-aminoethyl)-pyridine
4-(aminoethyl)-piperidine
3-amino-N-ethylpiperidine
N-(2-aminoethyl)-piperidine
N-(2-aminoethyl)-piperazine
3-picolylamine
4-picolylamine
2-(aminoethyl)-1-ethylpyrrolidine
N-(3-aminopropyl)-2-pyrrolidine
N-(2-aminoethyl)-morpholine
N-(3-aminopropyl)-morpholine
4-imidazole The following specific examples will further illustrate the production and use of the aggregated polyelectrolyte polymers of this invention although it will be understood that the invention is not limited to these specific examples. The results obtained in several examples are set forth in convenient tabular form following the respective examples. In these examples, abbreviations of several materials are defined as follows:

MIBPA = methyl-imino-bis-propylamine
DMAPA = dimethylaminopropylamine
DEAEA = diethylaminoethylamine
HOEtA = monoethanolamine
HMDA = hexamethylenediamine FIG. 1 of the drawings shows a photomicrograph of the aggregated polymer prepared in Example 3 at a magnification of 200 ×. A similar polymer was prepared as in this example but without the aggregation process. FIG. 2 of the drawings shows a photomicrograph of this unaggregated polymer prepared in Example 9 also at a magnification of 200 ×. The striking differences in physical structure are readily apparent from these comparative photomicrographs.

The polymer aggregates are a multiplicity of small individual particles held together in clusters without fusion. In general, the major portion of the unaggregated polymer has a particle size ranging from about 0.1 microns to about 10 microns whereas the major portion of the aggregated polymer has a particle size ranging from about 50 to about 200 microns.

EXAMPLE 1

A 5-liter reaction flask, equipped with reflux condenser, Dean-Stark water take-off, stirrer, reagent addition vessel, thermometer and nitrogen-purge attachments is charged with 193.05 g. ethylene/maleic anhydride copolymer (EMA) (1.5 moles, anhydride basis) and 2700 ml. xylene. The charge is stirred at 200 r.p.m. with a 6.5 inch blade-type stirrer while it is heated to the reflux temperature. This reflux temperature will vary from 135° to 139° C. depending on the water content of the EMA and upon whether this water is azeotropically removed during the ensuring reflux period. In the present example the slurry was maintained at total reflux for 60 minutes under total reflux return at a temperature of 135° C. After 1 hour the reactor was cooled to 125° C. under nitrogen and a solution mixture of 10.89 g. MIBPA (0.075 mole) and 1.5 ml. water was added. The mixture was heated to reflux (134° C.) and maintained at reflux for 1 hour while continuously removing water azeotrope (final temperature was 137° C.). The reaction mixture was again lowered to 125° C. under nitrogen and a solution mixture of 153.3 g. DMAPA (1.5 moles) and 4.5 ml. water was added. The slurry was then heated to 133° C. and held at this temperature (1–10 min.) until refluxing began as a consequence of water being formed during the chemical reaction. Stirring and refluxing of the reacting slurry was continued until water removal by azeotropic distillation was complete. The final temperature was 139° C.

Product Work-up

For work-up as the free amine form, the above slurry was filtered hot and the product cake was reslurried in 2700 ml of a 3:1 mixture of xylene and ethanol, stirred at reflux temperature for one hour and then filtered hot. This was repeated a second time for a 2 hour period and a third time for a 3 hour refluxing period, in each case followed by hot filtration. The resulting extracted product cake was then reslurried in 2700 ml. hexane for 1 hour at room temperature and filtered. The hexane extraction was repeated a total of four times. The final product was airdried for 30 minutes and finally dried in a vacuum oven at 55° C.

The work-up as the hydrochloride salt form, the final reaction slurry was filtered hot and the product cake reslurried at reflux in 3:1 xylene-alcohol three times, as above, followed by two 1-hour room temperature extractions with 2700 ml. acetone. The filtered product was converted to the hydrochloride by reslurrying in either 2700 ml. alcohol or acetone and gradually adding with stirring (over 10 min.) 112 ml. conc. (12N) hydrochloric acid and stirring at room temperature for two hours. The filtered product was subsequently washed (slurry with stirring) three consecutive times with 10 liters of water (deionized) for 2 hours each time and finally filtered. The filtered salt cake was reslurried four times in 2700 ml. acetone (1 hour each time) to remove the water, filtered, air dried for 30 minutes and vacuum oven dried at 55° C.

The final dried product, either as free amine or as salt, was screened without grinding with 95% of the product going through a 100 mesh screen before bottling for use.

EXAMPLE 2

The aggregated diethylaminoethyl derivative was prepared using the identical procedure of Example 1 except that 174.32 g. DEAEA (1.5 moles) was substituted for the DMAPA in Example 1. The final product was obtained as the free amine form using the work-up procedure of Example 1 wherein the reaction product was consecutively extracted with three 3:1 xylene-alcohol extractions followed by four hexane extractions. The product was sieved unground through a 100 mesh screen to yield 229 g. of material finer than 100 mesh and 13.0 g. coarser than 100 mesh.

EXAMPLE 3

This example utilized the same equipment, the same aggregation procedure and the same initial charge (EMA and xylene) as described in Example 1. After the aggregation period (1 hour reflux) the slurry temperature was lowered to 125° C. and 10.89 g. (0.075 moles) MIBPA was added. The slurry was stirred at 120°–125° C. for 1 hour without reflux. After 1 hour 7.66 g (0.075 moles) DMAPA was added and the slurry was again stirred at 120°–125° C. for 1 hour without reflux. After this period the slurry was heated to reflux and the total water of the condensation reaction was removed by distillation as the azeotrope. The final temperature was 139° C. The reaction mixture was then cooled to 120° C., 87.05 g. of HOEtA was added, and the slurry maintained at 120° for 1 hour. The temperature was then raised to reflux and the water from this final condensation reaction completely removed over a 6 hour period by distillation as the azeotrope. The final temperature was 140° C. The product was worked up as the free amine as described in Example 1 for free amine work-up procedure. 230 g. of product was obtained which passed through a 100 mesh screen unground; 17 g. of product was retained on the screen.

EXAMPLE 4

In order to improve the dispersion characteristics of the product of Example 3 the order of addition of MIBPA and DMAPA was reversed following the aggregation step.

The same amounts of amines and other raw materials of Example 3 were used. The procedure was identical through the aggregation step. After cooling the aggregated slurry to 125° C., 7.66 g. of DMAPA was added and the slurry was held at 120°–125° C. for one hour. Then 10.89 g. MIBPA was added and the slurry was again held at 120°–125° C. for 1 hour. From this point on the procedure was exactly the same as described in Example 3. The final product was worked-up as the free amine form.

EXAMPLE 5

The identical procedure of Example 4 was repeated except that the final product was worked-up as the hydrochloric acid salt by the procedure described in Example 1. For this purpose only 14 ml. concentrated hydrochloric acid (12N) was used instead of the 112 ml. used in Example 1. After drying, 240 grams of product was obtained.

EXAMPLE 6

The procedure of Example 3 was repeated except that water of the condensation reaction was removed by azeotropic distillation after each of the amine reactions and holding times, i.e. after MIBPA, after DMAPA and after HOEtA reaction instead of as in Example 3. The product was obtained as the hydrochloride salt in 240 g yield.

EXAMPLE 7

Many preparative examples were made in which the composition was varied with respect to the various amines used as crosslinker or functional moiety both in type and concentration. These aggregated compositions are summarized in the following table:

| Run | Composition, mole ratio (amine basis)* | | | | | Example Procedure | Product Form |
|---|---|---|---|---|---|---|---|
| | MIBPA | HMDA | DMAPA | DEAEA | HOEtA | | |
| 1 | 7 | | 5 | | 81 | 3 | F.A. |
| 2 | 9 | | 5 | | 77 | 6 | F.A. and Citrate |
| 3 | | 5 | | 5 | 85 | 6 | F.A. |
| 4 | | 5 | 5 | | 85 | 6 | F.A. |
| 5 | | 5 | 5 | | 85 | 4 | F.A. |
| 6 | 7 | | 3 | | 83 | 6 | F.A. |
| 7 | 9 | | 3 | | 79 | 6 | F.A. |
| 8 | 7 | | 7 | | 79 | 6 | F.A. |
| 9 | 9 | | 7 | | 75 | 6 | F.A. |
| 10 | 5 | | 3 | | 87 | 4 | F.A. |
| 11 | 5 | | 1 | | 89 | 4-5 | HCl. |

-continued

| Run | Composition, mole ratio (amine basis)* | | | | | Example Procedure | Product Form |
|---|---|---|---|---|---|---|---|
|  | MIBPA | HMDA | DMAPA | DEAEA | HOEtA | | |
| 12 | 9 | | | | 82 | 3 | F.A. |
| 13 | | 5 | 90 | | | 1 | HCl |
| 14 | | 7 | 86 | | | 1 | HCl |
| 15 | | 9 | 82 | | | 1 | HCl |
| 16 | | 3 | 94 | | | 1 | HCl |
| 17 | 9 | | 82 | | | 1 | HCl |
| 18 | 11 | | 78 | | | 1 | HCl |
| 19 | 20 | | 60 | | | 1 | F.A. |

F.A. = Free Amine
HCl = Hydrochloride salt
*All composition mole ratios in this and succeeding examples are on an amine basis. Since the cross-linking agent reacts at both ends, the moles of cross-linking agent would be double that shown when the mole ratio is converted to an anhydride basis.

EXAMPLE 8

The same equipment and the same initial charge of EMA and xylene was used as in Example 1. Aggregation, as obtained in Example 1, was precluded by one of two methods: (a) heat slurry of EMA at 200 r.p.m. to 90° C. and add 10.89 g MIBPA plus 1.5 ml. water, continue stirring at 90° C. for 1 hour, raise temperature to reflux (136° C.) and take off total water of reaction in the Dean-Stark trap by continued reflux (final temperature 139° C.); or (b) heat slurry of EMA at 200 r.p.m. to 125° C. and add the MIBPA and water and immediately raise to reflux temperature of 136° C. and continue refluxing until all water of reaction has been removed by azeotropic distillation at a final temperature of 139° C. After either procedure (a) or (b), above, the flask contents temperature was lowered to 125° C. and 153.3 g. DMAPA plus 4.5 ml water was added. The slurry was heated to 133° C. until refluxing began and refluxing was maintained until all water of reaction was removed by azeotropic distillation to a final temperature of 139°–140° C. The final slurry was filtered hot (over 100° C.). Filtering time at this point required from 30 to 60 minutes in contrast to filtering times of less than 5 minutes for aggregated products prepared by procedures of Examples 1 through 7. The filtered product was worked up as either the free amine or as the hydrochloride salt by procedures described in Example 1. Again, during work-up, filtering times were long (30 minutes to 2 hours) as contrasted to work-up filtering times associated with aggregated products of Examples 1 through 7 where these times varied from 5 to 10 minutes. Finally, non-aggregated products, prepared by this procedure and others to follow, dried poorly and had to be ground or ball-milled prior to sieving through a 100 mesh screen in contrast to aggregated products from Examples 1 through 7 which required no grinding or ball-milling prior to screening through 100 mesh screens after drying.

EXAMPLE 9

This example utilized the same equipment and the same EMA and xylene charge as in Example 8. The slurry was heated to 90°–95° C. and 10.89 g. (0.075 mole) MIBPA was added and stirred at 95° C. for 1 hour. Then 7.66 g (0.075 mole) DMAPA was added and stirred at 95° C. for 1 hour. The slurry was heated to reflux (134° C.) and water of reaction was completely removed by azeotropic distillation to a final temperature of 139° C. The slurry was then cooled to 95° C. and 87.05 g. of hydroxyethylamine was added and the slurry stirred at 95° C. for 1 hour. The slurry temperature was then raised to 134° C. and the total water of reaction was completely removed by azeotropic distillation to a final temperature of 139° to 140° C. The final slurry was filtered hot (30 minutes) and worked up as the free amine by the procedure of Example 1, dried, ground by extensive ball milling and screened through a 100 mesh screen. The recovered yields over 12 runs varied from 219 to 244 grams depending on the ball-milling efficiency prior to screening.

EXAMPLE 10

This procedure was the same as Example 8 except that the water of reaction was not removed after addition of MIBPA but was allowed to remain in the reaction slurry until after the DMAPA addition and then the total water of reaction from both amine reactions was removed in a single final azeotropic distillation. Final slurry temperature was 140° C. The product was worked-up as the free amine.

EXAMPLE 11

This procedure was identical to that of Example 1 except that the water of reaction was not removed after addition of MIBPA, following aggregation, but was allowed to remain in the reaction mixture slurry until after the DMAPA addition and then the total water of reaction from both amine reactions was removed in a single final azeotropic distillation. The final slurry was filtered hot in less than 5 minutes and the product was worked up as the free amine by the procedure of Example 1.

EXAMPLE 12

Effects of time and stirring rate during aggregation were considered with respect to final hot slurry filtration rates.

A series of comparable runs were made using the procedure of Example 1 wherein the aggregation time and stirring speed were varied. The products were all finished as the free amine following the Example 1 procedures. The results are shown in the following table as compared with a non-aggregated product prepared by Example 8.

| Product from: | Aggregation Variation | | | Solvent Used for Slurry | Product Slurry filtration time, 100° C., minutes |
|---|---|---|---|---|---|
|  | Time Min. | Temp. ° C. | Stirring Speed r.p.m. | | |
| Example 8 | 0 | — | 200 | Xylene | 30–60 |

-continued

| Product from: | Aggregation Variation | | | Solvent Used for Slurry | Product Slurry filtration time, 100° C., minutes |
|---|---|---|---|---|---|
| | Time Min. | Temp. ° C. | Stirring Speed r.p.m. | | |
| Example 1 Variation | 60 | 136-138 | 150 | Xylene | less than 5 |
| " | 60 | 136-138 | 200 | Xylene | less than 5 |
| " | 60 | 136-138 | 230 | Xylene | less than 5 |
| " | 10 | 136-138 | 250 | Xylene | less than 5 |
| " | 7 hr. | 139 | 200 | Xylene | less than 5 |
| " | 10 | 132-134 | 200 | 95/3 xylene/benzene* | less than 5 |

*this solvent composition is such as to hold the reflux temperature at 132-134° C.

EXAMPLE 13

In order to more completely characterize the solvent and temperature requirements for aggregation, a series of tests were carried out on EMA as received raw material in a variety of solvents and over a range of temperatures and stirrer speeds. It was found that variation in stirrer speeds from 150 to 400 r.p.m. affected only the formed aggregate size. Of more importance was the nature of the solvent and the temperature range at which aggregation occurred.

For this example, a one-liter flask was used and the charge was 700 ml solvent and 50 g. of EMA. At various times and temperatures a 20 ml aliquot of the slurry was removed and placed in vials. After cooling, the vials were shaken and the time for settling of the polymer from the solvent was measured with a stop watch as an indication of aggregate development. The results are recorded below.

| Solvent | Aggregation Conditions | | Settling time, minutes |
|---|---|---|---|
| | Temp., ° C | Time, Hr.:min. | |
| Xylene | 130 | 0 | greater than 15 min. |
| (b.p. 139) | 130 | 0:15 | 10 |
| | 130 | 0:40 | 6-7 |
| | 134 | 0 | 6 |
| | 134 | 0:10 | 4 |
| | 134 | 0:25 | 3 |
| | 138 | 0:01 | 2.5-3 |
| | 139 | 0:05 | 2-2.5 |
| | 139 | 0:10 | 2 |
| | 139 | 0:60 | 1.5 |
| Toluene | 24 | 0:00 | over 60 * |
| (b.p. 111° C.) | 108 | 0:00 | over 60 * |
| | 110 | 1:00 | over 45 * |
| | 110 | 2:00 | over 45 * |
| | 110 | 6:00 | over 45 * |
| Benzene | 24 | 0:00 | over 45 * |
| (b.p. 80° C.) | 79 | 0:00 | over 45 * |
| | 80 | 1:00 | over 45 * |
| | 80 | 2:00 | over 45 * |
| Dioxane | 23 | 0:00 | over 15 * |
| (b.p. 102° C.) | 100 | 0:00 | over 15 * |
| | 102 | 1:00 | over 15 * |
| | 102 | 3:00 | over 15 * |
| Monochlorobenzene | 23 | 0:00 | 23 min. |
| (b.p. 132° C.) | 130 | 0:00 | 23 min. |
| | 131 | 0:15 | 4 min.,26 sec. |
| | 131 | 0:30 | 3 min.,26 sec. |
| | 131 | 1:00 | 2 min.,40 sec. |
| | 131 | 2:00 | 2 min.,36 sec. |
| O-Dichlorobenzene | 24 | 0:00 | 23 min. |
| (b.p. 180° C.) | 140 | 0:00 | 23 min. |
| | 140 | 0:15 | 5 min. |
| | 140 | 1:00 | 3 min.,30 sec. |
| | 145 | 2:00 | 3 min.,30 sec. |
| Ethylbenzene | 23 | 0:00 | 45 min. |
| (b.p. 136° C.) | 134 | 0:00 | 29 min. |
| | 134 | 0:15 | 5 min.,30 sec. |
| | 134 | 1:00 | 3 min., 30 sec. |
| | 134 | 2:00 | 3 min. |
| Cumene | 24 | 0:00 | 29 min. |
| (b.p. 152° C.) | 140 | 0:00 | 29 min. |
| | 140 | 0:15 | 2 min. 30 sec. |
| | 140 | 1:00 | 2 min. 15 sec. |
| | 145 | 0:00 | 1 min. 38 sec. |
| | 145 | 0:30 | 1 min. 14 sec. |
| | 150 | 0:00 | 1 min. 10 sec. |
| | 150 | 0:15 | 0 min. 36 sec. |

* Settling test was discontinued after the stated time period.

EXAMPLE 14

A measure of particle size in dispersion, whether aggregated or non-aggregated, is the swelling index defined as the grams of aqueous or other dispersant which is absorbed at equilibrium per gram of polymer derivative. A suitable sized sample is dispersed in excess dispersant and adjusted to pH 4 or any other desired pH value. The dispersion is allowed to reach equilibrium over a 1 hour period and is then centrifuged at 750 × g. for 30 minutes in a preweighed centrifuge bottle. The supernate is decanted and the weight of centrifuged swollen gel is determined. All of the values are reported using 0.04 Molar saline as the dispersant and a pH of 4.0. The swelling index number is thus the weight of 0.04M saline absorbed by 1 gram of polymer.

Swelling is known to be inversely proportional to the crosslink density for crosslinked insoluble resins. For a series of derivatives with increasing MIBPA, the swelling decreases as expected, all other parameters being equal.

However for the present aggregated materials it was found that aggregate swelling at any constant MIBPA concentration, in equal crosslink density, could be varied easily, and differed markedly from non-aggregated derivatives, by varying the amount of water added during the aggregated polyelectrolyte preparation and by varying the removal steps of water from the reaction.

Several preparations of aggregated and non-aggregated polymer with the MIBPA and DMAPA charge composition of Examples 1, 8, 10 and 11 but with varied amounts of water added with either MIBPA or DMAPA are shown in the following table with the resultant variation in product swelling.

Table
Example 14
Aggregation vs Non-Aggregation vs. Swelling
as a function of added water and steps
of water removal. All products contain
5 mole percent MIBPA and 90 mole percent
DMAPA.

| Example Method | Total Water Added | Water Take off steps | Swelling Index | |
|---|---|---|---|---|
| | | | Aggregated | Non-Aggregated |
| No water added with either MIBPA or DMAPA | | | | |

Table-continued

Example 14
Aggregation vs Non-Aggregation vs. Swelling
as a function of added water and steps
of water removal. All products contain
5 mole percent MIBPA and 90 mole percent
DMAPA.

| Example Method | Total Water Added | Water Take off steps | Swelling Index Aggregated | Swelling Index Non-Aggregated |
|---|---|---|---|---|
| 11 | None | 1 | 9.54 | — |
| 1 | None | 2 | 10.05 | — |
| 10 | None | 1 | — | 9.44 |
| 8 | None | 2 | — | 8.91 |
| *No water added with MIBPA; 1.0 ml. water added with DMAPA* | | | | |
| 11 | 1.0 | 1 | 10.71 | — |
| 1 | 1.0 | 2 | 11.23 | — |
| 10 | 1.0 | 1 | — | 8.85 |
| 8 | 1.0 | 2 | — | 8.99 |
| *1.5 ml. water added with MIBPA; 4.5 ml. water added with DMAPA* | | | | |
| 11 | 6.0 | 1 | 12.98 | — |
| 1 | 6.0 | 2 | 13.00 | — |
| 10 | 6.0 | 1 | — | 8.88 |
| 8 | 6.0 | 2 | — | 9.43 |

EXAMPLE 15

As the swelling varied with varying amounts of water added with MIBPA and DMAPA and with the method of water removal, so did the protein adsorption capacity of the product resin.

Protein adsorption capacity was measured by the following method. 40 mg. human albumin and 10 mg. of polymer product in the amine or salt form were dispersed in 1.0 ml. of 0.04 molar saline and the pH adjusted to 7.0. The slurry was shaken for 30 minutes while keeping the pH at 7.0. After the 30 minute adsorption period the resin-albumin complex was centrifuged while saving the supernate. The solids were washed 3 times with 1.0 ml. water (5-min. shaking, centrifuging) and the combined supernates were assayed for protein by the method of Miller-Lowry, *Analytical Chemistry*, 31, 964 (1959). The albumin capacity values are given in terms of mg. albumin adsorbed per mg. polymer product.

The preparations listed in Example 14 are summarized in the following table wherein their albumin capacity is given as a result of preparation variation.

Table

Example 15
Aggregation vs Non-Aggregation vs Albumin
capacity as a function of added water and
steps of water removal. All products
contain 5 mole percent MIBPA and 90 mole
percent DMAPA.

| Example Method | Total Water Added | Water Take-off steps | Albumin Capacity Aggregated | Albumin Capacity Non-Aggregated |
|---|---|---|---|---|
| *No water added with either MIBPA or DMAPA* | | | | |
| 11 | None | 1 | 1.53 | — |
| 1 | None | 2 | 1.79 | — |
| 10 | None | 1 | — | 0.90 |
| 8 | None | 2 | — | 1.02 |
| *No water added with MIBPA; 1.01 ml. water added with DMAPA* | | | | |
| 11 | 1.0 | 1 | 1.35 | — |
| 1 | 1.0 | 2 | 1.63 | — |
| 10 | 1.0 | 1 | — | 0.87 |
| 8 | 1.0 | 2 | — | 1.28 |
| *1.5 ml. Water added with MIBPA; 4.5 ml. water added with DMAPA* | | | | |
| 11 | 6.0 | 1 | 2.75 | — |
| 1 | 6.0 | 2 | 2.40 | — |
| 10 | 6.0 | 1 | — | 1.80 |
| 8 | 6.0 | 2 | — | 2.10 |

EXAMPLE 16

Aggregated products of the type described not only have improved filtration characteristics during synthesis processes but have been found to give high flow characteristics during processes of plasma fractionation. Thus, non-aggregated polymers used for plasma fractionation by adsorbing desired proteins from plasma solutions had to be separated from the mother liquor by centrifugation processes because of immediate clogging of filter papers and cloths. The present aggregated products, with their improved and stable filtration character, were able to be used in plasma fractionation processes and separated from mother liquors by conventional vacuum filtration processes with fast filter times and little or no filter plugging in the presence of proteinaceous material, thus avoiding the need for expensive centrifugation-type apparatus.

The fast-flow properties of the described polyelectrolytes were further demonstrated in packed columns with only gravity flow. For this purpose glass columns were prepared, 2.2 cm I.D. by 30 cm in length, properly stoppered to hold resin with a small fiber glass plug on top of the bottom outlet. The resins as described in the following table were equilibrated overnight in 0.04 molar saline at pH 4 and the column filled or packed to a height of 8.5–10 cm. All resins used contained 5 mole percent MIBPA, thus keeping the crosslink density factor constant. Swelling differences result from variations in water added and water removal steps as noted.

Flow rates of 0.04 molar saline were measured for both aggregated and non-aggregated polyelectrolyte types. The expressed value of "relative flow rate" is given in cubic cm. per hour per unit volume of resin bed in the column under gravity flow and maintaining a 20 cm. saline head on top of the resin during the test.

Table

Example 16

| Ex. Method | Water added, ml. with MIBPA | Water added, ml. with DMAPA | Water Take-off steps | Swelling Index | Albumin Capacity | Flow Rate[1] |
|---|---|---|---|---|---|---|
| 8* | 1.5*** | 4.5 | 2 | 9.4 | 2.10 | 0.22 |
| 11 | None | 1.0 | 1 | 9.3 | 1.70 | 0.59 |
| 1 | 1.5 | 4.5 | 2 | 11.5 | 2.14 | 0.88 |
| 1 | 3.4 | 3.0 | 2 | 13.1 | 2.89 | 1.39 |
| 1** | 3.4*** | 3.0 | 2 | 16.4 | 3.31 | 1.75 |
| 9* | None | None | 2 | 3.05 | — | 0.12 |
| 5 | None | None | 2 | 3.20 | — | 1.88 |

[1] Flowrate = cc./hr./unit(cc)volume of bed resin.
* Non Aggregated - All others are aggregated.
** Aggregated 7 hours - all others for 1 hour.
*** MIBPA added at 90° - all others at 120–125° C.

EXAMPLE 17

Several preparations of aggregated polyelectrolytes were prepared using the procedure of Example 4 except that the third amine used to react with all anhydrides, except those reacted with MIBPA and DMAPA, was varied, i.e. other than HOEtA as in Example 4. The compositions and other variations, if any, of these aggregated products are listed in the following table.

| Run*** | MIBPA | Composition, mole percent DMAPA | Third Amine | | Product Form |
|---|---|---|---|---|---|
| 1 | 5(10.9g) | 5(7.66g) | 85(107.3g) | 3-hydroxypropylamine | F.A. |
| 2 | 5 | 5 | 85(107.3g) | 3-hydroxypropylamine | HCl** |
| 3 | 5 | 5 | 85(113g) | 2-hydroxypropylamine | F.A. |
| 4 | 5 | 5 | 85(127g) | 3-methoxypropylamine | F.A. |
| 5 | 5 | 5 | 85(127g) | 3-methoxypropylamine | HCl** |
| 6 | 20(43.57g) | 5 | 55(86.9g) | 3-methoxypropylamine | F.A. |
| 7 | 10(21.79g) | 5 | 75(113.7g) | 3-methoxypropylamine | F.A. |
| 8 | 10 | 10(15.33g) | 70(107.0g) | 3-methoxypropylamine | F.A. |
| 9 | 20 | 10 | 50(80.3g) | 3-methoxypropylamine | F.A. |
| 10 | 10 | 5 | 75(95.8g) | 2-methoxyethylamine | F.A. |
| 11 | 10 | 5 | 75(95.8g) | 2-methoxyethylamine | HCl** |
| 12 | 5(2.91g)* | 10(5.1g) | 80(40.6g) | 3-methoxypropylamine | HCl** |
| 13 | 5(7.26g) | 5(5.1g) | 85(84.7g) | 3-methoxypropylamine | HCl** |

* Hexamethylene diamine
** Prepared by procedure of Example 4; finished by procedure of Example 5.
*** Runs 1 through 11 used 1.5 moles (193g) of EMA as in Example 4; in Run 12 the EMA was substituted by 0.5 mole (101g) of styrene/maleic anhydride copolymer; and in Run 13 the EMA was substituted by 1.0 mole (154g) of isobutylene/maleic anhydride copolymer as starting polymer raw material.

All of these polyelectrolyte preparations possessed fast filtering properties characteristic of aggregated resins. All were aggregated for a period of 1 hour.

EXAMPLE 18

The DMAPA used in several of the previous Examples illustrates an example of a dialkylaminoalkylimide substituent on the polyelectrolyte. Another such substituent was the DEAEA (diethylaminoethylamine) used in Examples 2 and 7 (run 3) These two amines were used to represent aggregated dialkylaminoalkylimide polyelectrolyte substitution with 5 mole percent MIBPA in a 5/90 composition and with 5 mole percent HMDA and 85 mole percent HOEtA in a 5/5/85 composition.

Other non-aggregated dialkylaminoalkylimide preparations were made using the Example 9 procedure for the 5/5/85 compositions and the Example 8 procedure for the 5/90 compositions except that in no case was water added with any of the amines. The amines used were dimethylaminoethylamine, diethylaminoethylamine, diethylaminopropylamine, dimethylaminopropylamine, di-n-butylaminopropylamine, di-hydroxyethylaminopropylamine and 2-amino-5-diethylaminopentane. N-phenylethylenediamine was also used to prepare the above non-aggregated resins.

Similar non-aggregated compositions, using procedures of Examples 8 and 9, were prepared using various heterocyclic amines to give heterocyclic aminoalkylimide substituents. These amines included 2-(aminomethyl)-ethylpyrrolidine, 3-amino-N-ethylpiperidine, N-(2-aminoethyl)-piperidine, N-(3-aminopropyl)-2-pyrrolidone, N-(2-aminoethyl)-morpholine, N-(3-aminopropyl)-morpholine, N-(2-aminoethyl)-piperazine and 2-(2-aminoethyl)-pyridine.

Two of these heterocyclic type amines were used to prepare aggregated polyelectrolyte compositions of the 5/5/85 type using the reactants listed in the following table. The procedure in Example 4 was followed. In all cases the products were obtained as hydrochloride salts (according to the Example 5 procedure) and possessed fast filtration properties characteristic of aggregated derivatives in contrast to extremely slow filtration properties for the comparative non-aggregated preparations described above.

Table

| | Example 18 Composition, mole percent | | |
|---|---|---|---|
| Run | MIBPA | Heterocyclic Amine | Third Amine |
| 1 | 5 | 5(9.62g) 3-amino-N-ethylpiperidine | 87.05)HOEtA |
| 2 | 5 | 5(9.62g) 3-amino-N-ethylpiperidine | 85(127g) 3-methoxypropylamine |
| 3 | 5 | 5(10.82g) N-(3-aminopropyl)-morpholine | 85(87.05g) HOEtA |
| 4 | 5 | 5(10.82g) N-(3-aminopropyl)-morpholine | 85(127g) 3-methoxypropylamine |

Various other examples will be apparent to the person skilled in the art after reading the foregoing disclosure without departing from the spirit and scope of the invention and it is intended that all such examples be included within the scope of the appended claims.

What is claimed is:

1. A method of improving the filterability, drying characteristics and physical form of polymers used in making water-insoluble, cross-linked polyelectrolytes containing amine-imide functional groups without substantially diminishing the protein adsorption capacity of said polyelectrolytes comprising heating said polymer in an inert organic solvent or solvent mixture at a temperature ranging from about 115° C. to about 160° C. but lower than the softening point of said polymer for at least about 15 minutes and until said polymer is substantially aggregated, said polymer comprising a copolymer of (a) unsaturated monomer having from 2 to about 18 carbon atoms and (b) a monomer selected from the group consisting of unsaturated polycarboxylic acids or anhydrides having from 4 to about 12 carbon atoms, and said polymer being thus aggregated prior to the cross-linking and substitution with the major portion of said amine-imide functional groups.

2. The method of claim 1 in which the inert organic solvent is selected from the group consisting of xylene, ethylbenzene, mono- and dichlorobenzene, cumene and mixtures thereof.

3. The method of claim 1 in which the heating is carried out for about 15 minutes to about one hour.

4. The method of claim 1 in which the polymer is a copolymer of maleic acid or anhydride and monomer selected from the group consisting of ethylene, styrene and isobutylene.

5. The method of claim 4 in which the polymer is a copolymer of ethylene and maleic anhydride and/or acid.

6. An aggregated, water-insoluble, cross-linked polyelectrolyte containing amine-imide functional groups comprising a copolymer of (a) unsaturated monomer having from 2 to about 18 carbon atoms and (b) a monomer providing reactive sites and selected from the group consisting of unsaturated polycarboxylic acid or anhydride having from 4 to about 12 carbon atoms, and in which from about 2 to 100% of the reactive sites in said copolymer are substituted with amine-imide functional groups, said polyelectrolyte being thus aggregated prior to cross-linking and substitution with the major portion of said amine-imide functional groups, the major portion of said aggregated polyelectrolyte copolymer having a particle size ranging from about 50 to about 200 microns, said major portion in both instances being defined to mean more than 50% of the entire portion.

7. The aggregated polyelectrolyte of claim 6 in which said copolymer is a copolymer of maleic acid or anhydride and monomer selected from the group consisting of ethylene, styrene and isobutylene.

8. The aggregated polyelectrolyte of claim 7 in which said copolymer is a copolymer of ethylene and maleic acid or anhydride.

9. The aggregated polyelectrolyte of claim 6 in which the amine-imide functional group is selected from the group consisting of diloweralkylaminoloweralkylimide and lower-alkyliminodi(loweralkylimide).

10. The aggregated polyelectrolyte of claim 6 in which the amine-imide functional group is selected from the group consisting of aminoloweralkyl substituted pyridine, piperidine, piperazine, picoline, pyrrolidine, morpholine and imidazole.

* * * * *